United States Patent [19]
Springer et al.

[11] Patent Number: 5,385,765
[45] Date of Patent: Jan. 31, 1995

[54] SPLICING FOR FLUOROPOLYMER COATED BELTS

[75] Inventors: Linda L. Springer, Buskirk; Charles E. Carelli, Eagle Bridge, both of N.Y.

[73] Assignee: AlliedSignal Inc., Morris Township, Morris County, N.J.

[21] Appl. No.: 966,227

[22] Filed: Oct. 26, 1992

[51] Int. Cl.6 .................. B65H 19/22; B32B 3/02; B29D 28/00
[52] U.S. Cl. .................. 428/36.1; 112/262.1; 428/57; 428/58; 428/131; 428/137; 428/255
[58] Field of Search .......... 428/57, 255, 36.1, 58, 428/131, 137; 112/262.1; 242/58.1, 58.5; 57/22

[56] References Cited

U.S. PATENT DOCUMENTS

| | | | |
|---|---|---|---|
| 1,411,602 | 4/1922 | Barnard . | |
| 1,849,471 | 3/1932 | Arnold | 428/57 |
| 1,930,336 | 10/1933 | Buell . | |
| 2,391,731 | 12/1945 | Miller et al. | 51/188 |
| 2,408,422 | 10/1946 | Harris . | |
| 2,441,460 | 5/1948 | Walters | 74/232 |
| 2,737,466 | 3/1956 | Utermohler, Jr. et al. | 428/57 |
| 3,366,355 | 1/1968 | Haller | 245/10 |
| 3,596,858 | 8/1971 | Curtis | 245/10 |
| 3,728,183 | 4/1973 | Wasco | 156/73 |
| 3,936,338 | 2/1976 | Gibson . | |
| 4,083,090 | 4/1978 | Duvekot | 28/104 |
| 4,130,679 | 12/1978 | Breznak et al. | 428/58 |
| 4,501,782 | 2/1985 | Weatherly et al. | 428/57 |
| 4,530,868 | 7/1985 | Shinmi et al. | 428/57 |
| 4,569,870 | 2/1986 | Shinmi | 428/57 |
| 4,654,235 | 3/1987 | Effenberger et al. . | |

FOREIGN PATENT DOCUMENTS 3742101 12/1987 Germany .
1432357 9/1973 United Kingdom .
2254287 3/1992 United Kingdom .

OTHER PUBLICATIONS

PCT Search Report.

*Primary Examiner*—James D. Withers
*Attorney, Agent, or Firm*—Roger H. Criss

[57] ABSTRACT

This invention relates to a spliced fluoropolymer coated mesh fabric comprising a fluoropolymer coated mesh fabric having two ends that are overlapped so as to align the mesh voids, and a fluoropolymer cord interwoven through at least one row of the aligned voids of the overlapped ends.

30 Claims, 2 Drawing Sheets

SPLICING FOR FLUOROPOLYMER COATED BELTS

BACKGROUND OF THE INVENTION

1. Field of the Invention

The present invention relates to an improved splice for fluoropolymer coated webs or meshes. More particularly, the present invention relates to an improved splice for fluoropolymer coated glass mesh fabrics.

2. Description of the Prior Art

Endless belts have been utilized in various industrial applications, for example, in drying and heating applications in the food and paper industries. Endless belts formed from a fiber glass mesh fabric coated with a polymeric material have increasingly been utilized in such applications, replacing the conventional metallic endless belts. Different polymeric material coated glass fabrics can be fabricated to fit particular needs of each application. Of these, fluoropolymer, especially polytetrafluoroethylene (PTFE), coated glass fabrics are particularly suited for specialty applications and provide many desirable characteristics that were lacking from the conventional metallic or other polymeric material coated endless belts. Such desirable characteristics include chemical resistance, thermal resistance, flexibility and microwavability.

Conventionally, an endless belt made from a fluoropolymer coated glass fabric is formed by overlapping and stitching or heat-sealing the two ends of the belt fabric. Various metallic lacing devices, such as alligator lacing and clipper lacing, as they are known in the art, have also been utilized to make endless belts.

However, the conventional methods of joining the ends of a fluoropolymer coated glass fabric to form an endless belt have not been satisfactory. The joined end produced from the conventional stitching or heat-sealing methods is not only labor intensive but also has a substantially thicker dimension and is significantly rigid. Furthermore, the stitching and/or heat-sealing procedures result in blockage of the voids of the mesh unless particular care is taken during the stitching process. As for the metallic lacing methods, the metallic lace introduces inflexibility into the joined end that has different physical and chemical characteristics than the rest of the belt. In addition, the metallic lace renders the resulting endless belt to be unsuitable for microwave applications.

Many other methods of forming an endless belt have been disclosed, for example, in U.S. Pat. Nos. 3,936,3.38; 4,130,679; and 2,391,731. Particularly, U.S. Pat. No 3,936,338 teaches a method of joining and bonding the ends of a PTFE coated fiber glass belt by applying an overlapping strip of a thermoplastic film over the joined ends of the belt under heat and pressure. Although the splicing method disclosed therein may be less labor intensive than the other prior art methods, the thick joined ends and blocked voids of the mesh at the joined ends may not be suitable for certain applications.

In addition, as is known in the art, it is a common practice in the industry to repair damaged segments or an endless belt, instead of replacing the entire belt, for obvious economical reasons. However, the prior art splicing methods are not suited for such repairing applications since they are labor intensive procedures that introduce thick inflexible joined sections to the belt.

It would therefore be desirable to provide a splice that can be easily formed and is not subjected to the above-mentioned disadvantageous characteristics.

It would further be desirable to have a splicing method that is not only suited to fabricate endless belts but also can be utilized to repair damaged segments of the belts.

SUMMARY OF THE INVENTION

In accordance with the present invention, there provided a spliced fluoropolymer coated mesh fabric comprising a fluoropolymer coated mesh fabric which constitutes a plurality of a row of mesh voids and has two ends, overlapped at the ends, wherein the overlapped ends are arranged so as to align the mesh voids; and a fluoropolymer cord interwoven through at least one row of the aligned voids of the overlapped ends.

In accordance with the present invention, there is further provided a process for making a spliced fluoropolymer coated mesh fabric comprising the steps of: overlapping a fluoropolymer coated mesh fabric, which has weft (transverse) and warp (longitudinal) directions, constitutes a plurality of a row of mesh voids in the warp direction and has two ends, at the ends in the warp direction in a way as to align the voids of the mesh fabric; and interweaving a fluoropolymer cord through at least one row of the aligned voids of the overlapped ends in at least one direction, wherein the fluoropolymer cord is sufficiently large enough to roughly fill the voids of the mesh fabric.

BRIEF DESCRIPTION OF THE DRAWINGS

The invention will be more fully understood in conjunction with the drawings of which.

DETAILED DESCRIPTION OF THE INVENTION

Figure 1:
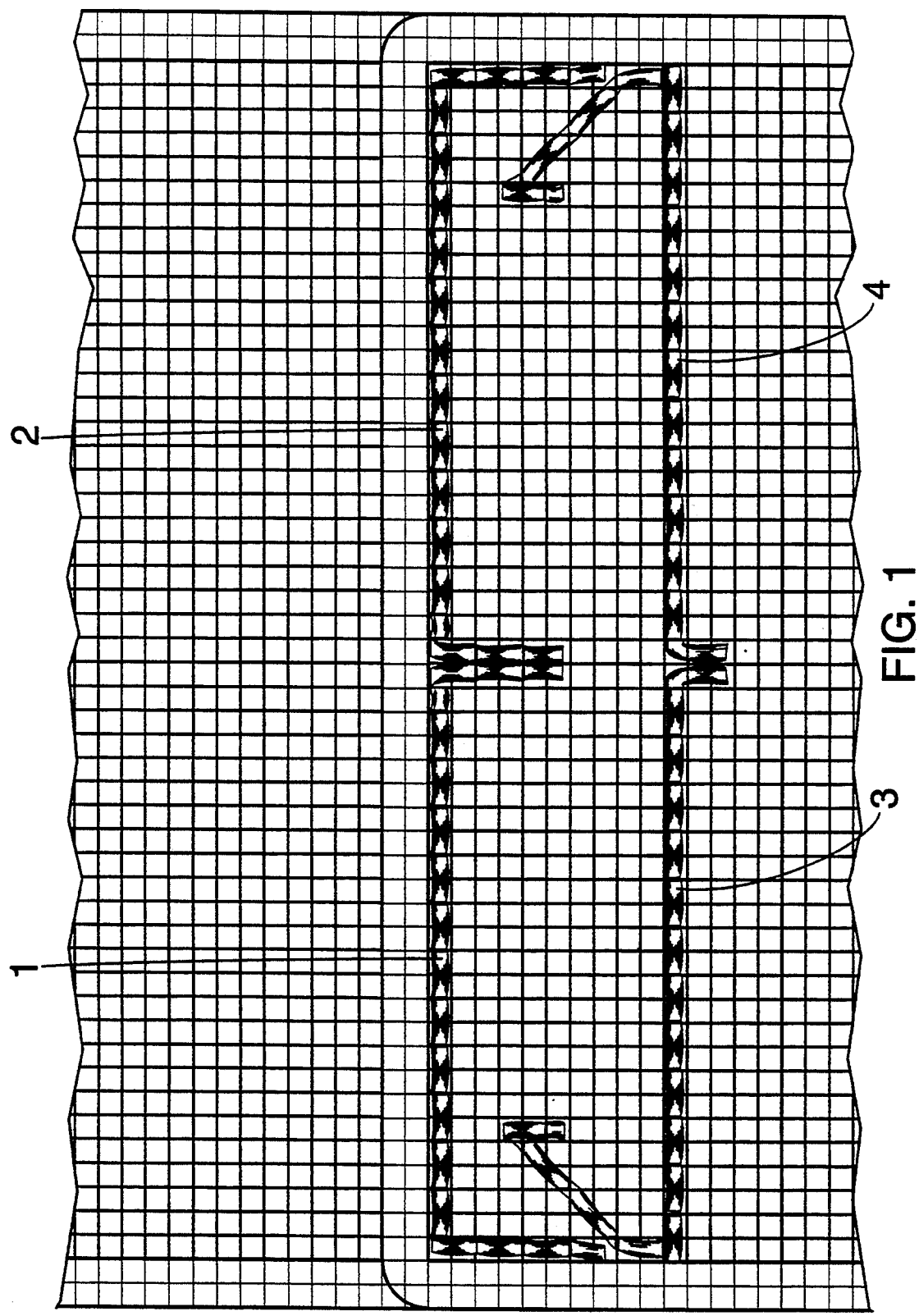
FIG. 1 is a top view of a portion of a spliced fluoropolymer coated mesh fabric illustrating an example of the spliced fabrics of the present invention in which the overlapped ends of the mesh fabric are woven with a number of fluoropolymer cords.

The present invention provides an improved splice for fluoropolymer coated mesh fabrics (or belts) and a method of making the splice. In accordance with the present invention, a continuous mesh fabric belt is formed by overlapping the two ends of a fluoropolymer coated mesh fabric in such a way as to align the mesh voids of the belt and weaving one or more of fluoropolymer cords through at least one row of the overlapped belt mesh, wherein the fluoropolymer cord is thick enough to substantially fill the voids of the mesh fabric. Optionally, the interwoven cord is subjected to an effective pressure treatment to securely fill the voids of the mesh, to tightly join the ends of the belt, and to reduce the thickness of the joined end.

The mesh fabric of the present invention may be woven or non-woven and is characterized in that the mesh fabric has a weft direction and a warp direction and that it forms a plurality of a row of repeating open network or voids in the warp direction. The mesh fabric may be produced from a polymeric material or a woven yarn made from fiber glass. Although any polymeric material that can be processed to form a mesh fabric may be utilized for the present invention, high performance polymers including liquid crystal polymers, such as Kevlar® and Nomex®, are preferred since they provide high strength, dimensional stability and high heat resistance. Of these suitable mesh fabrics, preferred are woven fiber glass mesh fabrics for their excellent heat resistance, chemical resistance, dimensional stability and flexibility. Suitable glass mesh fabrics for the present invention are fabrics woven from multifilament or monofilament fiber glass yarns, which are commercially available from various fiber glass fabric manufacturers. The most preferred are glass mesh fabrics woven from multifilament fiber glass yarns.

Suitable fluoropolymers to coat the mesh fabric of the present invention include PTFE, fluorinated ethylene propylene (FEP), polychlorotrifluoroethylene (PCTFE), ethylenechlorotrifluoroethylene copolymer (ECTFE), perfluoroalkoxy polymer (PFA), ethylenetetrafluoroethyiene copolymer (ETFE) and the like, as well as mixtures thereof. Of these, the most preferred is PTFE.

The most preferred mesh fabrics of the present invention are PTFE coated glass fiber mesh fabrics and such mesh fabrics are commercially available. The mesh fabrics may have different void (mesh) sizes and configurations to accommodate the needs of different applications. However, preferred mesh fabrics should have a sufficiently large void size that does not significantly interfere with free flow of heat, gas or vacuum. The preferred mesh fabrics have a square or rectangular void configuration and the voids have the width and height dimensions of at least 1/32 inch in each dimension. The more preferred mesh fabrics have the width and height dimensions of at least 1/16 inch; the most preferred, at least 3/16 inch.

The suitable fluoropolymer cord of the present invention may be a monofilament or multifilament that is twisted, braided or bundled. However, twisted and/or braided multifilaments are preferred in that they provide superior physical strength and flexibility.

The suitable fluoropolymer cords herein may be fabricated from a homopolymer, copolymer or blend of various fluoropolymers, such as those mentioned above as the suitable coating fluoropolymers. Such fluoropolymers include PTFE, FEP, PCTFE, ECTFE, PFA, ETFE and the like, as well as mixtures thereof. Of these suitable fluoropolymers, the most preferred is PTFE. The fluoropolymer cords may be filled with various fillers known in the art to be useful with fluoropolymers, including talc, glass fibers and glass beads; however, the unfilled fluoropolymer cords are preferred.

The preferred fluoropolymer cords of the present invention have an additional thin outerlayer of a fluoropolymer wrapping or coating over the core fluoropolymer cords. Preferably, the outerlayer has a thickness of between about 0.5 mils (13 µm) and about 10 mils (250 µm), more preferably between about 1 mil (25 µm) and about 7 mils (180 µm), most preferably between about 3 mils (75 µm) and about 5 mils (125 µm). The extra fluoropolymer outerlayer provides added strength and abrasion resistance to the cord and prevents separation of the cord filaments when a multifilament is utilized. Although the fluoropolymer for the outerlayer may be a sintered or unsintered polymer, a sintered fluoropolymer is preferred for its improved strength and abrasion resistance. Suitable fluoropolymers for the outerlayer include the fluoropolymers suitable for the cords of the present invention.

The most preferred fluoropolymer cords of the present invention are a twisted and/or braided PTFE multifilament cords. The PTFE cords are fabricated by twisting and/or braiding a number of sintered and/or unsintered filament strands or strips of PTFE into multifilaments, wherein the PTFE multifilament cords comprise, based on the total weight of the cord, up to about 50 wt %, preferably up to about 30 wt %, more preferably up to about 15 wt %, most preferably up to about 5 wt%, of sintered PTFE strands having a specific gravity of from about 2.0 to about 3.0, preferably from about 2.05 to about 2.5, more preferably from about 2.07 to about 2.4, most preferably from about 2.1 to about 2.3, and the balance being unsintered PTFE strands having a specific gravity of from about 0.75 to about 1.95, preferably from about 1.0 to about 1.9, more preferably from about 1.25 to about 1.8, most preferably from about 1.45 to about 1.65. It is believed that the sintered PTFE provides tensile strength and the unsintered PTFE provides flexibility and soft malleability to the cord. In addition, the PTFE multifilament cords of the present invention are preferably further wrapped or coated with PTFE in order to provide a smooth outer layer that prevents separation of the multifilament and reduces the grooves of the multifilament which may trap extraneous materials as well as to provide added strength and abrasion resistance. Although PTFE cords having an unsintered coating or wrapping are suitable for the present invention, it is preferred that the cords be further subjected to a sintering process known in the art to provide additional abrasion resistance and to impart added stiffness to facilitate the weaving process. An illustration of known sintering processes useful herein is placing the coated fluoropolymer cord in an oven at about 700° F. (370° C.) under a pressure between about 5 psi (0.03 MPa) and about 20 psi (0.14 MPa) until the fluoropolymer outerlayer compacts and cures. Alternatively, the PTFE multifilament may be wrapped or coated with fully sintered PTFE to provide the desirable characteristics without subjecting the multifilament to an additional sintering process.

The diameter of the fluoropolymer cord is selected depending upon the mesh size of the fabric to be spliced. In order to ensure secure joining of the two ends of a mesh fabric, it is preferred that the fluoropolymer cord should be sufficiently large enough to substantially fill the voids of the fabric mesh. Preferably, the voids are from about 20% to about 100%, more preferably from about 75% to about 95%, filled with the fluoropolymer cord. In addition, the shape of the fluoropolymer cord is selected depending upon the mesh shape of the fabric to be spliced. Such suitable cord shapes include round, rectangular and oval shapes. The preferred are rectangular or substantially rectangular shaped fluoropolymer cords.

The fluoropolymer cord may be woven through the overlapped ends using any effective weaving patterns. For example, at least one row of the entire length in the weft direction at the overlapped ends of the mesh fabric may be woven, and additional weaving in the warp direction may be provided for added strength. Alternatively, the fluoropolymer cord may also be woven in diagonal or crosswise directions. Preferably, the overlapped ends of a fabric mesh is woven in the weft direction as well as in the warp direction.

FIG. 1 illustrates a preferred weaving pattern on the present invention. The cords 1 and 2 are woven in the weft and warp directions to provide transversal and longitudinal stability to the spliced ends, and the cords 3 and 4 are woven in the diagonal direction in addition to the transversal and longitudinal directions to provide diagonal stability to the spliced ends.

Any known weaving methods may be employed, including but not limited to the "plain weave" in which the fluoropolymer cord passes successively under one mesh filament strand of the mesh fabric and then over the next mesh filament strand, or the "twill" weave in which the fluoropolymer cord passes over two mesh filament strands and then under the next strand, or a pattern wherein the cord passes alternately over a pair of mesh filament strands and then under a pair of mesh filament strands. FIG. 1 illustrates the plain weave.

Upon weaving the fluoropolymer cord, the woven portion of the resulting endless belt is optionally subjected to a pressure treatment, if a more rigidly joined end is required, in order to securely fill the voids of the woven mesh and to reduce the thickness of and to tightly secure the joined end. The pressure treatment should be sufficiently high enough to malleably shape the fluoropolymer cord to substantially or completely fill the voids of the woven mesh and to reduce the thickness of the joined end, but the pressure should not be too high as to crush the mesh fabric. Any suitable pressuring may be utilized, including manually hammering the woven portion on a flat surface and/or utilizing a press or presser rolls that are equipped with a proper pressure setting.

Figure 2:
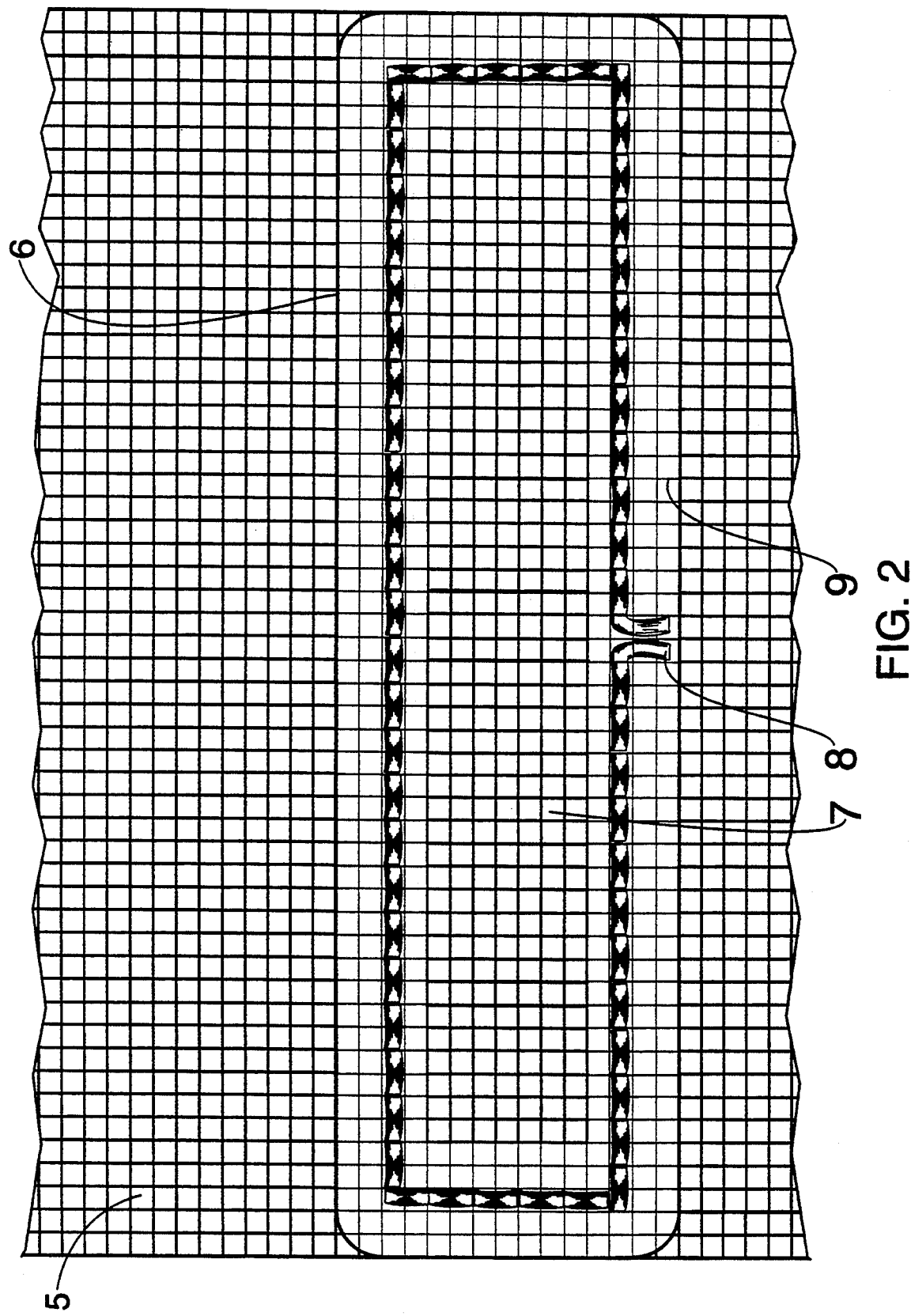
FIG. 2 is a top view of a repaired mesh fabric in which an example of the splices is applied over the damaged portion covered with a patch of the mesh fabric.

The splice of the present invention is also an excellent means to repair damaged segments of a mesh fabric. As an illustration, the splice disclosed herein may be utilized to repair a damaged segment of a mesh fabric by cutting out and replacing the damaged segment with a mesh fabric of the same shape that is larger than the damaged segment, and applying the splice of the present invention to the overlapped boundaries of the mesh belt. FIG. 2 illustrated an example of the use of the present splice to repair a damaged segment. A mesh fabric patch 6 is placed in overlapping relation with a mesh fabric 5 over the damaged portion 7, and a fluoropolymer cord 8 is woven through the overlapped portion 9 to repair the damaged portion 7. Although FIG. 2 illustrates the present splice with a continuous fluoropolymer cord, a multitude of short fluoropolymer cords may be utilized to accommodate the needs of different applications.

The improved splice of the present invention is an excellent means to fabricate endless belts from various mesh fabrics as well as to repair damaged segments. The splice provides excellent flexibility, chemical and heat resistance, microwavability and physical strength without adding any significant rigidity to the spliced section of the resulting belt. In addition, the splice of the present invention is reversible in that it does not create distinguishable exterior or interior surface. As such, a spliced belt of the present invention is suitable for use in various industrial applications, especially in conveyer belt applications, including belts for food cooking ovens, shrink-wrap ovens and screen-print dryers, that require free flow of heat or air through the belt.

It is to be noted that even though the present invention is described as a splice for endless belts and repairing means for the same, the present splice can also be utilized for other purposes, such as to join or extend open-ended mesh belts.

What is claimed is:

1. A spliced fluoropolymer coated mesh fabric comprising a fluoropolymer coated mesh fabric, which constitutes a plurality of mesh voids in a warp and weft direction and has two ends, overlapped at said ends, wherein said overlapped ends are arranged so as to align said mesh voids; and a fluoropolymer cord interwoven through at least one row of said aligned voids of said overlapped ends, said cord roughly filling said voids of said mesh fabric.

2. A spliced mesh fabric according to claim 1, wherein said mesh fabric is a glass fiber fabric.

3. A spliced mesh fabric according to claim 1, wherein said mesh fabric is a liquid crystal polymer fabric.

4. A spliced mesh fabric according to claim 1, wherein said mesh fabric is coated with a fluoropolymer selected from the group consisting of polytetrafluoroethylene, fluorinated ethylene propylene, polychlorotrifluoroethylene, ethylenechlorotrifluoroethylene copolymer, perfluoroalkoxy polymer, and ethylenetetrafluoroethylene copolymer.

5. A spliced mesh fabric according to claim 1, wherein said mesh fabric is coated with polytetrafluoroethylene.

6. A spliced mesh fabric according to claim 1, wherein said fluoropolymer cord is fabricated from a fluoropolymer selected from the group consisting of polytetrafluoroethylene, fluorinated ethylene propylene, polychlorotrifluoroethylene, ethylenechlorotrifluoroethylene copolymer, perfluoroalkoxy polymer, and ethylenetetrafluoroethylene copolymer.

7. A spliced mesh fabric according to claim 1, wherein said fluoropolymer cord is fabricated from polytetrafluoroethylene.

8. A spliced mesh fabric according to claim 1, wherein said fluoropolymer cord is a twisted or braided multifilament which comprises fluoropolymer strands.

9. A spliced mesh fabric according to claim 8, wherein said fluoropolymer cord further comprises a thin, outermost coating or wrapping of a fluoropolymer.

10. A spliced mesh fabric according to claim 8, wherein said fluoropolymer cord comprises, based on the total weight of the cord, up to about 50 wt % of sintered PTFE having a specific gravity of from about 2.0 to about 3.0 and the balance being unsintered PTFE strands having a specific gravity of from about 0.75 to about 1.95.

11. A spliced mesh fabric according to claim 1, wherein said mesh voids have a square or rectangular configuration and extend at least 1/32 inch in each dimension of said voids.

12. A spliced mesh fabric according to claim 1, wherein said mesh voids of said mesh fabric extend in a warp direction and a weft direction, and wherein said fluoropolymer cord is interwoven through at least a portion of one row of said aligned voids in both said warp direction and said weft direction.

13. A spliced mesh fabric according to claim 12, wherein said fluoropolymer cord is also interwoven through said voids in a direction diagonal to said warp and weft directions.

14. A spliced mesh fabric according to claim 1, wherein said fluoropolymer cord has been subject to pressure treatment after being interwoven through said aligned voids.

15. A spliced fluoropolymer coated mesh fabric comprising a first fluoropolymer coated mesh fabric and a splice formed of a second fluoropolymer coated mesh fabric superimposed over a section of said first fluoropolymer coated mesh fabric, both of said mesh fabrics comprising a plurality of rows of mesh voids extending in a warp direction and in a weft direction, said mesh voids of said second fluoropolymer coated mesh fabric being arranged so as to align with said mesh voids of said first fluoropolymer mesh fabric; and a fluoropolymer cord interwoven through at least one row of said aligned voids in both said first fluoropolymer coated mesh fabric and said second fluoropolymer coated mesh fabric, said cord roughly filling said aligned voids of said first fluoropolymer coated mesh fabric and said second fluoropolymer coated mesh fabric.

16. A spliced mesh fabric according to claim 15, wherein said fluoropolymer cord is interwoven through at least a portion of one row of said aligned voids in both said warp direction and said weft direction of each of said first and second fluoropolymer coated mesh fabrics.

17. A spliced mesh fabric according to claim 16, wherein said mesh voids in each of said first and second fluoropolymer coated mesh fabrics have a square or rectangular configuration and extend at least 1/32 inch in each dimension of said voids.

18. A spliced mesh fabric according to claim 16, wherein said fluoropolymer cord has been subject to pressure treatment after being interwoven through said aligned voids.

19. A process for making a spliced fluoropolymer coated mesh fabric comprising the steps of:
 a) overlapping a fluoropolymer coated mesh fabric, of said mesh fabric; and
 b) interweaving a fluoropolymer cord through at least one row of said aligned voids of said overlapped ends in at least one direction,
 wherein said fluoropolymer cord is sufficiently large enough to roughly fill said voids of said mesh fabric.

20. A process for making a spliced mesh fabric according to claim 19, wherein said mesh fabric is a glass fiber fabric.

21. A process for making a spliced mesh fabric according to claim 19, wherein said mesh fabric is a liquid crystal polymer fabric.

22. A process for making a spliced mesh fabric according to claim 19, wherein said mesh fabric is coated with a fluoropolymer selected from the group consisting of polytetrafluoroethylene, fluorinated ethylene propylene, polychlorotrifluoroethylene, ethylenechlorotrifluoroethylene copolymer, perfluoroalkoxy polymer, and ethylenetetrafluoroethylene copolymer.

23. A process for making a spliced mesh fabric according to claim 19, wherein said mesh fabric is coated with polytetrafluoroethylene.

24. A process for making a spliced mesh fabric according to claim 19, wherein said fluoropolymer core is fabricated from a fluoropolymer selected from the group consisting of polytetrafluoro-ethylene, fluorinated ethylene propylene, polychlorotri-fluoroethylene, ethylenechlorotrifluoroethylene copolymer, perfluoroalkoxy polymer, and ethylenetetrafluoroethylene copolymer.

25. A process for making a spliced mesh fabric according to claim 19, wherein said fluoropolymer corn is fabricated from polytetrafluoro-ethylene.

26. A process for making a spliced mesh fabric according to claim 19, wherein said fluoropolymer cord is a twisted or braided multifilament which comprises fluoropolymer strands.

27. A process for making a spliced mesh fabric according to claim 26, wherein said fluoropolymer cord further comprises a thin, outermost coating or wrapping of a fluoropolymer.

28. A process for making a spliced mesh fabric according to claim 18, wherein said fluoropolymer cord comprises, based on the total weight of the cord, up to about 50 wt % of sintered PTFE having a specific gravity of from about 2.0 to about 3.0 and the balance being unsintered PTFE strands having a specific gravity of from about 0.75 to about 1.95.

29. A process for making a spliced mesh fabric according to claim 19, including interweaving said fluoropolymer cord through at least a portion of said aligned voids in both said warp direction and said weft direction.

30. A process for making a spliced mesh fabric according to claim 19, including subjecting said fluoropolymer cord after said interweaving step to a pressure treatment.

* * * * *

UNITED STATES PATENT AND TRADEMARK OFFICE
CERTIFICATE OF CORRECTION

PATENT NO. : 5,385,765
DATED : January 31, 1995
INVENTOR(S) : Linda L. Springer, et. al.

It is certified that error appears in the above-indentified patent and that said Letters Patent is hereby corrected as shown below:

Claim 1, Column 6, line 3, add --a-- after "in a warp and".
Claim 19, Column 7, line 33, add --which constitutes a plurality of mesh voids in a warp and a weft direction and has two ends, to align the voids of each end-- after "fabric".
Claim 24, Column 8, line 12, "core" should read --cord--.
Claim 25, Column 8, line 20, "corn" should read --cord--.
Claim 28, Column 8, line 31, "claim 18" should read --claim 26--.

Signed and Sealed this

Twenty-first Day of November, 1995

Attest:

BRUCE LEHMAN

Attesting Officer

Commissioner of Patents and Trademarks